United States Patent
Asami et al.

(10) Patent No.: US 8,822,627 B2
(45) Date of Patent: Sep. 2, 2014

(54) METHOD OF MANUFACTURE OF NOVOLAC-TYPE PHENOL RESIN

(75) Inventors: Masakatsu Asami, Tokyo (JP); Takuya Tochimoto, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 15 days.

(21) Appl. No.: 13/699,085

(22) PCT Filed: Jun. 10, 2011

(86) PCT No.: PCT/JP2011/063362
§ 371 (c)(1),
(2), (4) Date: Nov. 20, 2012

(87) PCT Pub. No.: WO2011/158751
PCT Pub. Date: Dec. 22, 2011

(65) Prior Publication Data
US 2013/0066036 A1    Mar. 14, 2013

(30) Foreign Application Priority Data

Jun. 14, 2010  (JP) ................................ 2010-134781

(51) Int. Cl.
*C08G 14/02* (2006.01)
*C08G 8/10* (2006.01)

(52) U.S. Cl.
CPC ...................................... *C08G 8/10* (2013.01)
USPC ......................................... 528/141; 527/137

(58) Field of Classification Search
CPC ....................................................... C08G 8/04
USPC .......................................... 528/141; 527/137
See application file for complete search history.

(56) References Cited

U.S. PATENT DOCUMENTS

| | | | | |
|---|---|---|---|---|
| 4,016,348 | A | * | 4/1977 | Adams .......................... 526/293 |
| 6,326,453 | B2 | * | 12/2001 | Asami et al. .................. 528/141 |
| 2001/0004664 | A1 | | 6/2001 | Asami et al. |
| 2012/0095156 | A1 | * | 4/2012 | Hayashi et al. ............... 524/541 |

FOREIGN PATENT DOCUMENTS

| | | |
|---|---|---|
| JP | 04-226181 A | 8/1992 |
| JP | 2001-329034 A | 11/2001 |
| JP | 2002-105157 A | 4/2002 |
| JP | 2002-128849 A | 5/2002 |
| JP | 2002-194041 A | 7/2002 |
| JP | 2004-238618 A | 8/2004 |
| JP | 2004-339256 A | 12/2004 |

OTHER PUBLICATIONS

International Search Report of PCT/JP2011/063362, mailing date Sep. 6, 2011.

* cited by examiner

*Primary Examiner* — Shane Fang
(74) *Attorney, Agent, or Firm* — Westerman, Hattori, Daniels & Adrian, LLP

(57) ABSTRACT

A method of manufacture of novolac-type phenol resin, wherein phenols and aldehydes are allowed to react with each other, a water-soluble organic phosphonic acid is used as a reaction catalyst, and a tertiary phosphine compound is used as a reaction promoter. It is preferable that the aforementioned organic phosphonic acid have the structure shown in the following general formula (1):

$$R\text{—}PO(OH)_2 \qquad (1)$$

(R is a group which contains a carbon atom, and which contains —COON and/or —PO(OH)$_2$).

9 Claims, No Drawings

METHOD OF MANUFACTURE OF NOVOLAC-TYPE PHENOL RESIN

TECHNICAL FIELD

The present invention relates to a method of manufacture of a novolac-type phenol resin.

Priority is claimed on Japanese Patent Application No. 2010-134781, filed Jun. 14, 2010, the content of which is incorporated herein by reference.

BACKGROUND ART

Novolac-type phenol resin is obtained by causing reaction of phenols and aldehydes with organic or inorganic acids such as hydrochloric acid, sulfuric acid, phosphoric acid, phosphorous acid, oxalic acid, and p-toluenesulfonic acid. The molecular weight of novolac-type phenol resin is commonly adjusted by the loading ratio or the like of the phenols and aldehydes. Novolac-type phenol resin of low molecular weight tends to have a wide molecular weight distribution. As common means for narrowing molecular weight distribution, there is a method which causes reaction in organic solvent, and a method which removes low molecular weight components by steam distillation or solvent washing. However, novolac-type phenol resin of low molecular weight is not obtained in the former method, and yield greatly diminishes in the latter method.

In response to this problem, for example, a method of manufacture of novolac-type phenol resin has been disclosed wherein phenols and aldehydes are reacted using organic phosphonic acid as the reaction catalyst (see, e.g., Patent Document 1). However, further improvement is desirable with respect to reduction of unreacted phenols, increased yield of novolac-type phenol resin, and so on.

PRIOR ART DOCUMENTS

Patent Documents

Patent Document 1: Japanese Unexamined Patent Application, First Publication No. 2002-194041

DISCLOSURE OF THE INVENTION

Problem to be Solved by the Invention

The present invention offers a method of high-yield manufacture of novolac-type phenol resin with a low content of unreacted phenols and with a narrow molecular weight distribution.

Means for Solving the Problem

These objectives can be achieved by the present invention as described in [1]-[6] below.

[1] A method of manufacture of novolac-type phenol resin, wherein phenols and aldehydes are allowed to react with each other, a water-soluble organic phosphonic acid is used as a reaction catalyst, and a tertiary phosphine compound is used as a reaction promoter.

[2] The method of manufacture of novolac-type phenol resin according to [1], wherein 100 to 5000 ppm of the tertiary phosphine compound is used relative to the phenols.

[3] The method of manufacture of novolac-type phenol resin according to [1] or [2], wherein the phenols and aldehydes are reacted in the reaction system under conditions of a moisture content of 30 weight % or less and a reaction temperature of 110 to 200° C.

[4] The method of manufacture of novolac-type phenol resin according to any one of [1] to [3], wherein the organic phosphonic acid has a structure represented by the following general formula (1):

R—PO(OH)$_2$      (1)

(R is a group which contains a carbon atom, and which contains —COON and/or —PO(OH)$_2$).

[5] The method of manufacture of novolac-type phenol resin according to any one of [1] to [4]e, wherein the tertiary phosphine compound is triphenyl phosphine.

[6] The method of manufacture of novolac-type phenol resin according to any one of [1] to [5], wherein said phenols and aldehydes are reacted in a closed apparatus.

[7] The method of manufacture of novolac-type phenol resin according to any one of [1] to [6], wherein said phenols, aldehydes, water-soluble organic phosphonic acid, and tertiary phosphine compound are supplied together to cause a reaction.

[8] The method of manufacture of novolac-type phenol resin according to any one of [1] to [5], wherein said phenols and aldehydes are reacted in a continuous mixing apparatus.

[9] The method of manufacture of novolac-type phenol resin according to [8], wherein a stationary mixer is used as the continuous mixing apparatus.

Effects of the Invention

Compared to conventional methods of manufacture of novolac-type phenol resin, the method of manufacture of the present invention can obtain novolac-type phenol resin in high yield with a low content of unreacted phenols, and with a narrow molecular weight distribution. It is therefore suitable as a method of manufacture of industrial novolac-type phenol resin.

BEST MODE FOR CARRYING OUT THE INVENTION

Preferred examples of the method of manufacture of novolac-type phenol resin (hereinafter simply "manufacturing method") of the present invention are described in detail below. However, the present invention is not limited to these examples alone, and may be subjected to modifications, omissions, or additions of number, quantity, type, or conditions within a scope that does not deviate from the invention.

The manufacturing method of the present invention is a method of manufacture of novolac-type phenol resin which causes reaction of phenols and aldehydes; it uses a water-soluble organic phosphonic acid as a reaction catalyst, and a tertiary phosphine compound as a reaction promoter.

There are no particular limitations on the phenols used in the manufacturing method of the present invention. One type or two or more types of phenol may be selected, and may be used in combination as necessary. As preferred examples of phenols which may be used, one may cite at least one or more types of phenols selected from a group consisting of phenol, orthocresol, methacresol, paracresol, xylenol, paratertiary butylphenol, paraoctylphenol, paraphenylphenol, bisphenol A, bisphenol F, and resorcin. As other preferred examples, one may cite ethylphenol, isopropylphenol, nonylphenol, cumylphenol, aminophenol, nitrophenol, naphthol, hydroquinone, bisphenol S, dihydro xylnaphthalene, and so on.

There are no particular limitations on the aldehydes which may be used in the manufacturing method of the present invention. One type or two or more types of aldehydes may be selected, and may be used in combination as necessary. Preferable aldehydes are any selected from among formaldehyde, acetoaldehyde, butylaldehyde, acrolein, propionaldehyde, chloral, furfural, glyoxal, butylaldehyde, caproaldehyde, arylaldehyde, benzoaldehyde, crotonaldehyde, phenylacetaldehyde, trialdehyde, salicylaldehyde, and the like, or mixtures thereof. Substances that are sources of aldehydes, or solutions of these aldehydes may also be used in the manufacturing method of the present invention. As examples of substances that are sources of aldehydes, one may cite, for example, paraformaldehyde, hexamethylene tetramine, polyoxymethylene, and the like.

The reaction mol ratio of the aforementioned phenols and aldehydes is preferably 0.1 to 3 mol, more preferably 0.3 to 2.0 mol, and still more preferably 0.5 to 1.0 mol of aldehydes relative to 1.0 mol of phenols.

There are no particular limitations on the reaction method of the phenols and aldehydes. For example, the reaction may be conducted by loading the total amount of phenols and aldehydes in one batch at the start of reaction to form a mixture, and then by adding the reaction catalyst and reaction promoter to the mixture. It is also acceptable to mix the entirety thereof in one batch. Or in order to suppress heat generation at the start of reaction, the reaction may be conducted by adding the phenols, reaction catalyst, and reaction promoter to the reaction vessel, and by thereafter successively adding the aldehydes. The addition of aldehydes may be divided into two or more additions.

The organic phosphinic acid used as the reaction catalyst in the manufacturing method of the present invention is an organic compound containing a phosphonic acid group —PO(OH)$_2$; any compound may be used that it is water-soluble. Among the aforementioned organic phosphonic acids, the organic phosphonic acids shown by the following general formula (1) are preferable for purposes of obtaining novolac-type phenol resin in high yield with a low content of unreacted phenols and a narrow molecular weight distribution.

$$R\text{—}PO(OH)_2 \quad (1)$$

(R is a group which contains a carbon atom, and which contains —COOH and/or —PO(OH)$_2$)

This organic phosphonic acid contains one or more of —PO(OH)$_2$, and R in the formula contains a carbon atom and at least one of —COOH and —PO(OH)$_2$. The aforementioned R may be selected according to necessity, but a compound with a lower carbon number is more preferable, as water solubility is enhanced thereby.

As examples of the organic phosphonic acid shown in the aforementioned general formula (1), there are aminopolyphosphonic acids such as ethylene-diaminetetrakismethylene-phosphonic acid, ethylene-diaminebismethylene-phosphonic acid, aminotrismethylene-phosphonic acid, β-aminoethylphosphonate N,N-diacetic acid and aminomethylphosphonate N,N-diacetic acid; 1-hydroxyethylidene-1,1'-diphosphonic acid, 2-phosphonobutane-1,2,4-tricarboxylic acid, and the like.

In view of the objectives of the present invention, it is preferable to use aminotrismethylene phosphonic acid, 1-hydroxyethylidene-1,1'-diphosphonic acid, and 2-phosphonobutane-1,2,4-tricarboxylic acid which are industrially mass-produced at low cost.

The additive amount of organic phosphonic acid is preferably 0.001 to 4.0 mol, more preferably 0.003 to 2.0 mol, still more preferably 0.005 to 1.0 mol, and most preferably 0.01 to 0.5 relative to 1 mol of phenols. When the additive amount of organic phosphonic acid increases, there is a greater effect in obtaining novolac-type phenol resin in high yield with a low content of unreacted phenols and with a narrow molecular weight distribution. However, the effect does not change when the additive amount of reaction catalyst exceeds 4.0 mol. When the additive amount of organic phosphonic acid is less than 0.001 mol, the effect as a reaction catalyst is essentially nil. The additive amount of organic phosphonic acid may be selected according to necessity within the aforementioned range of the present invention, but residual components decrease when the amount of organic phosphonic acid decreases, and this is advantageous.

With the manufacturing method of the present invention, it is also possible to use the aforementioned catalysts and the like in combination with acids used in the manufacture of ordinary novolac-type phenol resin such as oxalic acid, sulfuric acid, hydrochloric acid, and p-toluenesulfonic acid. Combined use of these acids is particularly effective in accelerating reaction of high molecular polymers having 4 nuclides or more, and is an effective means of controlling molecular weight distribution.

The tertiary phosphine compound used as a reaction promoter in the manufacturing method of the present invention may be selected according to necessity, and there is, for example, trimethylphosphine, triethylphosphine, triphenyl phosphine, methyldiphenylphosphine, dimethylphenylphosphine, tritolylphosphine, trismethoxyphosphine, tributylphosphine, trioctylphosphine, tricyclohexylphosphine, and so on. Among these, triphenyl phosphine with its strong hydrophobic properties is more preferable for the purposes of the present invention. By this means, it is possible to enhance the effect of the present invention in obtaining novolac-type phenol resin in high yield with a low content of unreacted phenols and with a narrow molecular weight distribution.

The additive amount of the tertiary phosphine compound is preferably 100 to 5000 ppm, more preferably 300 to 3500 ppm, and still more preferably 500 to 2000 ppm relative to the phenols. With an additive amount of less than 100 ppm, there is little effect in terms of obtaining novolac-type phenol resin in high yield with a low content of unreacted phenols and with a narrow molecular weight distribution as a result of addition of the tertiary phosphine compound. When 5000 ppm is exceeded, there is no substantive change in the effect. The additive amount of the tertiary phosphine compound may be selected according to necessity within the aforementioned range, but residual components decrease when the quantity of the tertiary phosphine compound decreases, and this is advantageous.

The various conditions of the manufacturing method of the present invention may be selected according to necessity. For example, for excellent reaction of the phenols and aldehydes, it is satisfactory to set the moisture content in the reaction system at 40 weight % or less—and preferably at 30 weight % or less—from the standpoint of effects and handling. The reaction can be preferably conducted with setting of the reaction temperature to 110 to 200° C.

These reaction conditions are effective not only in reacting unreacted phenols, but also in more selectively reacting novolac-type phenol resin having low molecular weight of 2 nuclides or 3 nuclides. The reaction conditions are conditions which effectively enable narrowing of molecular weight distribution. In other words, reaction of unreacted phenols can also be sufficiently conducted even under reaction conditions that depart from the aforementioned conditions—i.e., with a large amount of moisture and at low temperature—but on the other hand, more selective reaction of resin in relatively low molecular weight of 2 nuclides, 3 nuclides and the like may be insufficient under reaction conditions that depart from the aforementioned conditions, with the result that molecular weight distribution tends to widen.

In the present invention, moisture content in the reaction system is moisture content relative to the total amount of phenols, aldehydes, novolac-type phenol resin obtained by the reaction of phenols and aldehydes, organic phosphonic acid, tertiary phosphine compound, moisture and the like existing in the reaction system.

With respect to moisture, there is the moisture that is added at the time of loading, the moisture contained in the aldehydes that are added, the moisture contained in the organic phosphonic acid that is added, the moisture that derives from used raw materials such as crystalline water of organic phosphonic acidr and the like, the condensation water generated during reaction, and the like. In the present invention, such moisture content in the reaction system is satisfactorily at 40 weight % or less, preferably at 30 weight % or less, more preferably at 1 to 20 weight %, and still more preferably at 1 to 15 weight %. With respect to the calculation method of moisture content in the reaction system, moisture amount in the loading raw material and condensation water amount generated in the reaction is considered as the moisture amount in the reaction system, and this amount is divided by the total loading amount to obtain the moisture content. In the case where reaction is conducted while the water is removed by distillation, the moisture amount obtained by subtracting the moisture amount removed by distillation from the aforementioned moisture amount of the loading raw material and the condensation water amount generated by reaction is the moisture amount in the reaction system. As the effect of obtaining novolac-type phenol resin in high yield with a low content of unreacted phenols and a narrow molecular weight distribution increases as this moisture content decreases, moisture content in the reaction system is more preferably 20 weight % or less. However, as the organic phosphonic acid becomes increasingly viscous or consolidates, and as catalytic action decreases when moisture content is excessively low, moisture content is preferably 1 weight % or more. Such a content may correspond to moisture content which includes at most crystallization water. When moisture content exceeds 30 weight %, the effects are almost unchanged.

The reaction temperature in the manufacturing method of the present invention may be selected according to necessity. However, in some instances, when lower than 110° C., the organic phosphonic acid which is the catalyst may experience increased viscosity or consolidation with a decline in catalytic action under conditions of low moisture content as mentioned above. When 200° C. is exceeded, decomposition of the organic phosphonic acid and decomposition of the novolac-type phenol resin may occur. It is therefore preferable to conduct reaction in a range of 110° C. or more and 200° C. or less. On the other hand, decomposition of organic phosphonic acid and novolac-type phenol resin is inhibited at low temperature. However, when moisture content is 1 to 20 weight %, the temperature range for purposes of having a condition where catalytic action is sufficiently manifested without increased viscosity or consolidation of the organic phosphonic acid is preferably 130 to 160° C. In the present invention, the means, equipment, and conditions for stirring that may be used when conducting the reaction can be selected as desired.

If the reaction occurs under normal pressure, reflux temperature is approximately 110 to 200° C. in a moisture content range of 30 weight % or less. Reaction at normal pressure is a preferable condition in terms of controlling temperature and moisture content. Otherwise, as reaction conditions which may be employed in the present invention, one may conceive of solvent reflux dehydration reaction using non-water-soluble solvents such as butanol or propanol, as well as high-pressure reaction and the like. A reaction which removes generated condensation water by distillation or the like while adding aldehydes is preferable, because moisture content is constant in the reaction system. However, as there is a drawback that unreacted phenols tend to be removed together with moisture at this time, caution is required. In order to overcome this drawback, reaction can be conducted so that unreacted phenols are not distilled until unreacted phenols are at or below a fixed quantity, after which the reaction can be continued with setting of moisture in the reaction system to 30 weight % or less and reaction temperature to 110 to 200° C. after having removed or while removing moisture by distillation.

The following is considered to be the reason why, in the manufacturing method of the present invention, novolac-type phenol resin is obtained in high yield with a low content of unreacted phenols and a narrow molecular weight distribution by using organic phosphonic acid as a reaction catalyst and by using a tertiary phosphine compound as a reaction promoter.

The organic phosphonic acid used in the manufacturing method of the present invention has very high water solubility. However, organic phosphonic acid has the properties that its solubility in phenols is low, and that its solubility in novolac-type phenol resin is further lessened in conjunction with increases in the molecular weight of the resin. Consequently, during reaction, there is a condition of phase separation into an aqueous phase including a large amount of organic phosphonic acid as the reaction catalyst, and an organic phase composed of phenols and the formed novolac-type phenol resin from which the reaction catalyst is almost completely absent. Phenols and low molecular weight components of 2 nuclides or the like are eluted with relative ease in the aqueous phase, and the eluted portion reacts with the aldehydes in the aqueous phase. However, with respect to high molecular weight regions—i.e., high molecular weight components—there is hardly any elution in the aqueous phase, and the reaction does not advance. Moreover, the novolac-type phenol resin generated in the aqueous phase is quickly extracted in the organic phase, and advancement of the reaction beyond that is inhibited.

However, a minute amount of reaction catalyst exists also in the organic phase that contains phenols and novolac-type phenol resin. Consequently, the reaction progresses even in the organic phase, and this reduces the effect of narrowing molecular weight distribution while achieving high yield.

Now, by employing a tertiary phosphine compound as a reaction promoter, the catalytic action of the organic phosphonic acid in the organic phase is suppressed. By this means, the disparity in reaction speed between the low molecular weight regions and high molecular weight regions is increased compared to the case where only organic phosphoric acid is used as a reaction catalyst, thereby enabling manufacture of novolac-type phenol resin in high yield with a low content of unreacted phenols and a narrow molecular weight distribution.

The present invention is characterized by use of an organic phosphonic acid as a reaction catalyst and a tertiary phosphine compound as a reaction promoter, and preferably by reaction conditions where moisture content in the reaction system is 30 weight % or less, and reaction temperature is 110 to 200° C.

The reason why setting of the aforementioned preferred reaction conditions in the manufacturing method of the present invention enables obtainment of novolac-type phenol resin in high yield with a narrow molecular weight distribution is thought to be as follows. By setting moisture content in the reaction system at a low level of 30 weight % or less, and reaction temperature at a high level of 110° C. or more, the following effects can be obtained. First, the high temperature facilitates elution to the aqueous phase not only of phenols but also of components of 2 nuclides, 3 nuclides and the like, which are classified in low molecular weight regions, and the reaction advances easily in the aqueous phase. A condition is then maintained where moisture content in the aqueous phase is low, and ion concentration in the aqueous phase is high. As this results in a firmer separation at the interface of the aqueous phase and the organic phase, reaction on the organic phase side can be prevented. Although organic phosphonic acid has the property that viscosity increases and that consolidation occurs when its concentration is high, it enters a molten state due to the high temperature, enabling prevention of loss of the catalytic function. Due to such actions, it is possible to further enhance the effect of obtaining novolac-type phenol resin in high yield with a low content of unreacted phenols and with a narrow molecular weight distribution.

In the manufacturing method of the present invention, phenols and aldehydes may undergo reaction in a closed apparatus as necessary. In the case where reaction is conducted at normal pressure using an open reaction apparatus, when rapid heat generation occurs in the reaction system, the components in the reaction system such as phenols, aldehydes and water undergo bumping, and spill out from the reaction apparatus, and it becomes difficult to further increase temperature due to the boiling of the aforementioned components. By conducting the reaction in a closed apparatus, this type of problem can be avoided even in such cases, enabling the reaction to efficiently advance in a short time. There are no particular limitations on the closed apparatus which may be used in the present invention. For example, an autoclave or the like may be cited. In addition, phenols, aldehydes, a water-soluble organic phosphonic acid, and a tertiary phosphine compound can also be loaded in one batch in the closed apparatus, and reacted. By mixing them simultaneously, the reaction can be made to efficiently advance in a short time.

In the manufacturing method of the present mention, the phenols and aldehydes can be reacted in a continuous mixing apparatus. There are no particular limitations on the continuous mixing apparatus referred to here, provided that it conducts mixing in a continuous system. For example, one may cite stationary mixers, in-line mixers having a drive unit, and so on.

There are no particular limitations on stationary mixers, provided that the apparatus does not have a drive unit, and conducts mixing of multiple types of fluids. For example, one may use an apparatus which is configured by an element that exhibits mixing action, and a housing that stores it. There are also no particular limitations on the form of the element. For example, one may use an element which is a rectangular plate twisted at 180° into a spiral shape or the like, and which is ordinarily configured by continuous linkage of multiple units thereof. The subject mixing fluids transit the interior of the housing that stores the element(s), thereby undergoing actions such as division, transformation, reversal and the like that render a uniform product.

There are also no particular limitations on in-line mixers having a drive unit. For example, one may use an apparatus which is configured by a stirrer that exhibits mixing action, and a housing that stores it.

To cite examples of stirrers, there are those which conduct mixing by rotation of a screw-shaped shaft that attaches helical blades, and those which are composed of a stator and a turbine, and which conduct mixing of subject mixing fluids by high-speed rotation of the turbine. In either case, the apparatus has the function of rendering the subject mixing fluids uniform by actions such as mixing, dispersion and the like by driving the stirrer, and causing passage of the subject mixing fluids.

There are no particular limitations on the aforementioned continuous mixers in the manufacturing method of the present invention, but those which have a temperature regulation mechanism are preferable. By this means, the phenols and aldehydes can be reacted at an appropriate temperature. When the raw material mixture transits the interior of the continuous mixing apparatus, it receives highly accurate heat transfer from the continuous mixing apparatus due to the aforementioned actions, and the reaction can advance with a high degree of uniformity.

In the manufacturing method of the present invention, there are no particular limitations on the method for supplying the phenols, aldehydes, water-soluble organic phosphonic acid, and tertiary phosphine compound to the continuous mixing apparatus. For example, one may cite a method where prescribed amounts of the respective raw materials are continuously provided by a constant-flow pump or the like according to a mixing ratio. Here, the aldehydes can, for example, be supplied in small doses from multiple sites at intermediate points of the continuous mixing apparatus.

When conducted by the aforementioned method, resin of the supplied raw material can be continuously obtained by preferably continuously terminating the reactions with one pass, resulting in an efficient and preferred mode.

Otherwise, one may also cite a method wherein prescribed amounts of the phenols, aldehydes, water-soluble organic phosphonic acid, and tertiary phosphine compound are measured out and charged into a tank or the like, and uniformly mixed to prepare the raw material mixing liquid, after which this is supplied to a continuous mixing apparatus. In this case, the raw material mixing liquid which has transited the continuous mixing apparatus may be returned to the original tank to undergo a circulating reaction, or it may be sent to a separate tank.

Generally, caution may be required in cases where reaction is conducted using an open reaction apparatus under normal pressure. For example, when the reaction system is rapidly heated, it may result in abrupt heat generation, bumping of the components in the reaction system such as phenols, aldehydes and water, and spillage from the reaction apparatus, rendering it difficult to further increase temperature due to boiling of the aforementioned components.

If the reaction is conducted in a continuous mixing apparatus, this type of problem can be avoided even in such cases, enabling the reaction to efficiently advance in a short time.

There are no particular limitations on transit speed (hereinafter "flow speed") in a continuous mixing apparatus in the manufacturing method of the present invention. With respect to flow speed when a stationary mixer is used as the continuous mixing apparatus, quicker speeds are preferable. 3 m/minute or more is preferable, and 5 m/minute or more is more preferable. When an in-line mixer having a drive unit is employed, quicker stirrer speeds are preferable with respect to the drive unit.

This is because the reaction progresses in a state where the aqueous phase containing the catalyst and the organic phase containing the phenols are unmixed and non-uniform. Therefore, at quicker flow speeds or stirrer speeds, the contact interface of the aqueous phase and the organic phase is increased, and the reaction progresses efficiently.

When the flow speed or stirrer speed is too slow, there may occur portions that stay within the continuous mixing apparatus, resulting in partial gelation.

There are no particular limitations on the size, configuration or the like of the continuous mixing apparatus used in the manufacturing method of the present invention, because these are dependent on the type of employed continuous mixing apparatus, and the flow speed and reaction temperature at the time when the raw material mixture is passed through, and will also differ according to the reaction mode such as continuous system or circulating system. Generally, it is sufficient to have a mixing apparatus wherein the required reaction time—e.g., a reaction time of 2 to 3 minutes—can be ensured.

To cite one example, in the case where a stationary mixer is used as the continuous mixing apparatus, and where reaction is conducted at 120° C. or more with a flow speed of a raw material mixture in a continuous system of 5 m/minute, the length of the stationary mixer will be 10 to 15 m.

With respect to the phenol resin obtained by the manufacturing method of the present invention, the content of unreacted phenols is low, and molecular weight distribution is narrow. As a result of these factors, the aforementioned phenol resin has excellent flow properties during melting, hardening properties, and the like. Accordingly, it may be preferentially used in materials such as molding materials, friction materials, shell molds, proppant (frac sand), and the like.

When phenol resin obtained by the manufacturing method of the present invention is used in these applications, modifiers such as hardening accelerators, lubricants, silane coupling agents and the like may be added as necessary. As hardening accelerators, one may cite amines, and organic acids such as salicylic acid, benzoic acid, and maleic acid. As lubricants employing basic compounds such as aniline, one may use, for example, ethylene bis-stearamide, methylene bis-stearamide, oxystearamide, stearamide, methylol stearamide and the like. As silane coupling agents, one may use, for example, aminosilane coupling agents, epoxysilane coupling agents, vinylsilane coupling agents, and so on.

EXAMPLES

The present invention is described below in detail by Examples. References made herein to "parts" indicate "parts by weight", and "%" indicates " % by weight" except for the content of 2-nuclide components.

Example 1

500 parts of a 60% aqueous solution of 1-hydroxyethylidene-1,1'-diphosphinic acid (Feliox-115, manufactured by Lion Corporation) were added to a 3-liter three-necked flask, and were distilled under normal pressure to a concentration of 80%. To this were added 1 part of triphenyl phosphine and 1000 parts of phenol, the temperature was raised to 100° C., and 550 parts of a 37% formaldehyde aqueous solution were successively added over a 30 minute period. Distillation was conducted under normal pressure, temperature was raised to 130° C., and moisture content in the reaction system was set at 6%. Subsequently, while maintaining temperature at 130° C., and keeping moisture content constant at approximately 6%, 140 parts of a 37% formaldehyde aqueous solution were added over a 30-minute period while conducting distillation under normal pressure. The amount of phenol lost to distillation during this period was 0.3% relative to the loaded phenol.

Subsequently, reaction was conducted under reflux for 1 hour at 140° C. Moisture content in the system during reaction was 6% at the start of reaction, and 25% at the end of reaction. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin. Subsequently, the temperature was raised to 130° C. while conducting distillation under normal pressure, and the temperature was raised to 150° C. while conducting reduced pressure distillation at a reduced pressure of 5000 Pa to obtain 1073 parts of a phenol resin A.

Example 2

Except that the additive amount of triphenyl phosphine used in Example 1 was changed to 0.1 parts, phenol resin was manufactured by the same process as Example 1 to obtain 1073 parts of a phenol resin B.

Example 3

Except that the additive amount of triphenyl phosphine used in Example 1 was changed to 5 parts, phenol resin was manufactured by the same process as Example 1 to obtain 1078 parts of a phenol resin C.

Example 4

1000 parts of phenol, 300 parts of 1-hydroxyethylidene-1,1'-diphosphinic acid (95% or more of 1-1-hydroxyethylidene-1,1'-diphosphinic acid (1 hydrate), manufactured by Kishida Chemical Co., Ltd.), and 1 part of triphenyl phosphine were added to a 3-liter three-necked flask. The temperature thereof was raised to 140° C., 277.5 parts of 92% paraformaldehyde were successively added over a 30-minute period, and reaction was conducted under reflux for 1 hour at 126° C. Moisture content in the system during this reaction was 2% at the start of reaction, and 12% at the end of reaction. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 1074 parts of a phenol resin D.

Example 5

1000 parts of phenol, 200 parts of a 60% aqueous solution of 1-hydroxyethylidene-1,1'-diphosphinic acid (Feliox-115, manufactured by Lion Corporation), and 1 part of triphenyl phosphine were added to a 3-liter three-necked flask. The temperature thereof was raised to 100° C., 690 parts of 37% formaldehyde aqueous solution were successively added over a 30-minute period, and reaction was conducted under reflux for 1 hour at 100° C. Moisture content in the system during this reaction was 7% at the start of reaction, and 37% at the end of reaction. Upon termination of the reaction, the reaction product was sampled, and the amount of unreacted phenols was measured using gas chromatography. Thereafter, 500 parts of pure water were admixed as in Example 1, after which the aqueous phase that had separated from the resin was removed. This washing step was conducted three times. Subsequently, the temperature was raised to 130° C. while conducting distillation under normal pressure, and the temperature was raised to 150° C. while conducting reduced pressure distillation at a reduced pressure of 5000 Pa to obtain 1058 parts of a phenol resin E.

Example 6

1000 parts of phenol, 240 parts of a 50% aqueous solution of aminotrismethylene phosphonic acid (Dequest 2000, manufactured by Solutia Japan Limited), and 1 part of triphenyl phosphine were added to a 3-liter three-necked flask. The temperature thereof was raised to 100° C., 690 parts of 37% formaldehyde aqueous solution were successively added over a 30-minute period, and reaction was conducted under reflux for 1 hour at 100° C. Moisture content in the system during this reaction was 10% at the start of reaction, and 38% at the end of reaction. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 1054 parts of a phenol resin F.

Example 7

1000 parts of phenol, 240 parts of a 50% aqueous solution of 2-phosphonobutane-1,2,4-tricarboxylic acid (PBTC, manufactured by Johoku Chemical Co., Ltd.), and 1 part of triphenyl phosphine were added to a 3-liter three-necked flask. The temperature thereof was raised to 100° C., 690 parts of 37% formaldehyde aqueous solution were successively added over a 30-minute period, and reaction was conducted under reflux for 1 hour at 100° C. Moisture content in the system during this reaction was 10% at the start of reaction, and 38% at the end of reaction. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 1049 parts of a phenol resin G Example 8

1000 parts of phenol, 1000 parts of a 60% aqueous solution of 1-hydroxyethylidene-1,1'-diphosphinic acid (Feliox-115, manufactured by Lion Corporation), and 1 part of triphenyl phosphine were added to a 3-liter three-necked flask. The temperature thereof was raised to 100° C., 690 parts of 37% formaldehyde aqueous solution were successively added over a 1 hour period, and reaction was conducted under reflux for 1 hour at 100° C. Moisture content in the system during this reaction was 20% at the start of reaction, and 38% at the end of reaction. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 1066 parts of a phenol resin H.

Example 9

3000 parts of phenol, 3000 parts of a 60% aqueous solution of 1-hydroxyethylidene-1,1'-diphosphinic acid (Feliox-115, manufactured by Lion Corporation), 1811 parts of a 37% formaldehyde aqueous solution (molar ratio F/P=0.7), and 3 parts of triphenyl phosphine were added to a 10-liter closed apparatus (autoclave) provided with a stirrer and a thermometer, and they were heated under the sealed condition. An abrupt exothermic reaction occurred at the point when the internal temperature was raised to 80° C., and the internal temperature was raised to 150° C. over approximately 3 minutes. Simultaneously, pressure was also raised to 0.45 MPa. A pressure-release cock was gradually opened at the point when the internal temperature dropped to 130° C., and internal pressure was returned to 0 MPa via a cooling tube. Internal pressure was lowered to 80° C., and the reaction product was extracted. Moisture content in the system during this reaction was 30% at the start of reaction, and 34% at the end of reaction. The reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 3242 parts of a phenol resin I.

Example 10

A stationary mixer (element form: rectangular plates twisted at 180 degrees and linked together in spiral form) of 10 m length capable of temperature adjustment by steam was connected via an opening-closing cock to the bottom of a 10-liter sealed container (device 1) provided with a stirrer and a thermometer. The outlet of the stationary mixer was connected via an opening-closing cock to the top of a 10-liter sealed container (device 2) provided with a stirrer, cooling tube, thermometer, and cooling unit.

1000 parts of phenol, 604 parts of a 37% formalin solution (molar ratio F/P=0.7), 1000 parts of a 60% aqueous solution of 1-hydroxyethylidene-1,1'-diphosphinic acid (Feliox-115, manufactured by Lion Corporation), and 1 part of triphenyl phosphine were added to device 1, and sufficiently mixed in a sealed condition at 60° C. The stationary mixer was maintained at a temperature of 160° C. Pressure was increased inside device 1 to 0.1 MPa by air, and the cock at the bottom of the device 1 was fully opened. Air pressure during this time was adjusted so that pressure inside device 1 was maintained at 0.1 MPa. The aperture of the cock at the top of device 2 was adjusted so that the time required for passage of the aforementioned mixture through the stationary mixer would be 2 minutes. Device 2 was cooled while stirring was conducted. Internal temperature in the stationary mixer (a thermometer was set up at a position that was 1 m from device 1) was raised to 133° C. After the interior of device 1 was emptied, and after completion of transfer of the entire amount to device 2, the air was stopped, and the cocks of devices 1 and 2 were closed. The internal temperature in device 2 was 64° C. at this time. Moisture content in the system during this reaction was 30% at the start of reaction, and 34% at the end of reaction. Subsequently, 500 parts of water were added, and stirrer was conducted for 15 minutes at an internal temperature of 80 to 90° C. The internal temperature was cooled to 60° C., followed by 10 minutes of still standing. The reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 1072 parts of a phenol resin J.

Comparative Example 1

Phenol resin was manufactured by the same process as Example 1,except that the addition of triphenyl phosphine which was carried out in Example 1 was not performed, and 1070 parts of a phenol resin K were obtained.

Comparative Example 2

Phenol resin was manufactured by the same process as Example 4,except that the addition of triphenyl phosphine which was carried out in Example 4 was not performed, and 1071 parts of a phenol resin L were obtained.

Comparative Example 3

Phenol resin was manufactured by the same process as Example 5,except that the addition of triphenyl phosphine which was carried out in Example 5 was not performed, and 1056 parts of a phenol resin M were obtained.

Comparative Example 4

Phenol resin was manufactured by the same process as Example 6,except that the addition of triphenyl phosphine which was carried out in Example 6 was not performed, and 1052 parts of a phenol resin N were obtained.

Comparative Example 5

Phenol resin was manufactured by the same process as Example 7,except that the addition of triphenyl phosphine which was carried out in Example 7 was not performed, and 1047 parts of a phenol resin O were obtained.

Comparative Example 6

Phenol resin was manufactured by the same process as Example 8,except that the addition of triphenyl phosphine which was carried out in Example 8 was not performed, and 1065 parts of a phenol resin P were obtained.

Comparative Example 7

Phenol resin was manufactured by the same process as Example 9,except that the addition of triphenyl phosphine which was carried out in Example 9 was not performed, and 3225 parts of a phenol resin Q were obtained.

Comparative Example 8

Phenol resin was manufactured by the same process as Example 10,except that the addition of triphenyl phosphine which was carried out in Example 10 was not performed, and 1062 parts of a phenol resin R were obtained.

Comparative Example 9

1000 parts of phenol and 10 parts of oxalic acid were added to a 3-liter three-necked flask, the temperature was raised to 100° C., and 690 parts of a 37% formaldehyde aqueous solution were successively added over a 30 minute period, after which reaction was conducted under reflux for 1 hour at 100° C. Upon termination of the reaction, the reaction product was sampled, and the amount of unreacted phenols was measured using gas chromatography. Subsequently, the temperature was raised to 130° C. while conducting distillation under normal pressure, and the temperature was raised to 190° C. while conducting reduced pressure distillation at a reduced pressure of 5000 Pa to obtain 957 parts of a phenol resin S.

Comparative Example 10

1000 parts of phenol and 10 parts of oxalic acid were added to a 3-liter three-necked flask, the temperature was raised to 100° C., 690 parts of a 37% formaldehyde aqueous solution were successively added over a 30 minute period, and reaction was conducted under reflux for 1 hour at 100° C. Upon termination of the reaction, the reaction product was sampled, and the amount of unreacted phenols was measured using gas chromatography. Thereafter, 500 parts of pure water were added, and a washing step was conducted three times to remove the aqueous phase that had separated from the resin, as in Example 1. Subsequently, the temperature was raised to 130° C. while conducting distillation under normal pressure, and the temperature was raised to 150° C. while conducting reduced pressure distillation at a reduced pressure of 5000 Pa to obtain 972 parts of a phenol resin T.

(Measurement Method)
1. The amount of unreacted phenols after reaction completion and the amount of free phenol in a phenol resin: measured by gas chromatography.
   Gas chromatography: measured in conformity with JIS K0114 by the internal standard method, with 2,5-xylenol as the internal standard
2. Softening point: measured in conformity with JIS K2207.
3. Kinetic viscosity of 50% ethanol solution: measured using Cannon-Fenske, with a 50% by weight ethanol solution at 25° C.
4. Number average molecular weight, weight average molecular weight, and 2-nuclide quantity: liquid chromatography
   Liquid chromatography: using GPC columns manufactured by Tosoh Corporation (G1000HXL: one column, G2000HXL: two columns, G3000HXL: one column), GPC measurement was conducted using a differential refractometer as the detector under analytic conditions of a flow rate of 1.0 ml/minute, tetrahydrofuran as the eluting solvent, and a column temperature of 40° C. to obtain molecular weight wherein the standard polystyrene conversion was used. The 2-nuclide quantity was obtained from the area ratio of the chart measured by liquid chromatography.

TABLE 1

| Item | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | | | | | | Resin type | | | | | |
| | | A | B | C | D | E | F | G | H | I | J |
| Unreacted phenol after completed reaction | Weight % | 0.0 | 0.2 | 0.0 | 0.1 | 0.7 | 1.3 | 1.6 | 0.3 | 0.8 | 0.9 |
| Number average molecular weight | Mn | 624 | 526 | 623 | 605 | 587 | 580 | 500 | 540 | 510 | 505 |
| Weight average molecular weight | Mw | 770 | 805 | 765 | 892 | 1485 | 1425 | 1256 | 1055 | 790 | 820 |
| Molecular weight distribution | Mw/Mn | 1.23 | 1.53 | 1.23 | 1.47 | 2.53 | 2.46 | 2.51 | 1.95 | 1.55 | 1.62 |
| Softening point | °C. | 97 | 98 | 99 | 95 | 101 | 101 | 100 | 100 | 72 | 70 |
| Kinetic viscosity of 50% ethanol solution | 25°C., μm²/s | 41 | 41 | 42 | 40 | 66 | 66 | 60 | 63 | 26 | 27 |
| Free phenol in phenol resin | Weight % | 0.0 | 0.0 | 0.0 | 0.0 | 0.3 | 0.7 | 0.8 | 0.1 | 0.5 | 0.6 |
| 2-nuclide quantity | % | 1.9 | 2.2 | 1.9 | 5.0 | 13.5 | 13.5 | 12.0 | 11.0 | 24.5 | 23.8 |

TABLE 2

| Item | Unit | Comparative example 1 | Comparative example 2 | Comparative example 3 | Comparative example 4 | Comparative example 5 | Comparative example 6 | Comparative example 7 | Comparative example 8 | Comparative example 9 | Comparative example 10 |
|---|---|---|---|---|---|---|---|---|---|---|---|
| | | | | | | Resin type | | | | | |
| | | K | L | M | N | O | P | Q | R | S | T |
| Unreacted phenol after completed reaction | Weight % | 0.6 | 1.2 | 1.5 | 2.5 | 2.9 | 0.7 | 1.4 | 1.8 | 7.6 | 7.5 |
| Number average molecular weight | Mn | 630 | 611 | 583 | 572 | 496 | 550 | 503 | 498 | 1264 | 1203 |
| Weight average molecular weight | Mw | 825 | 980 | 1547 | 1516 | 1325 | 1163 | 825 | 840 | 8263 | 8125 |
| Molecular weight distribution | Mw/Mn | 1.31 | 1.60 | 2.65 | 2.65 | 2.67 | 2.12 | 1.64 | 1.69 | 6.51 | 6.75 |
| Softening point | °C. | 94 | 92 | 100 | 99 | 98 | 98 | 70 | 69 | 103 | 99 |
| Kinetic viscosity of 50% ethanol solution | 25°C., μm²/s | 43 | 44 | 68 | 67 | 63 | 66 | 28 | 29 | 122 | 108 |
| Free phenol in phenol resin | Weight % | 0.1 | 0.2 | 1.1 | 1.9 | 2.0 | 0.5 | 1.2 | 1.4 | 1.8 | 4.7 |
| 2-nuclide quantity | % | 3.5 | 7.0 | 12.1 | 12.1 | 10.5 | 9.9 | 23.5 | 22.6 | 13.1 | 13.0 |

As is clear from the results of Table 1 and Table 2, the novolac-type phenol resins obtained in Examples 1 to 8 had narrower molecular weight distributions, smaller amounts of unreacted phenol and free phenol, and higher yields than comparative examples 1 to 6 in which a tertiary phosphine compound was not used as a reaction promoter, and comparative examples 7 to 8 in which oxalic acid was used us a reaction catalyst. The amount of unreacted phenol in phenol resin was particularly small in Examples 1 to 4 due to optimal reaction conditions.

As described above, according to the manufacturing method of the present invention, it is possible to obtain novolac-type phenol resin in high yield with a small amount of unreacted phenols, and with a narrow molecular weight distribution.

INDUSTRIAL APPLICABILITY

The present invention relates to a manufacturing method for obtaining novolac-type phenol resin in high yield with a small amount of unreacted phenols, and with a narrow molecular weight distribution. The novolac-type phenol resin obtained by the manufacturing method of the present invention may be suitably used, for example, as a binder of molding material, friction material, whetstone, sealant and the like, or as a coating material for proppant (frac sand) used during oil drilling.

The invention claimed is:

1. A method of manufacture of novolac-type phenol resin, wherein
   phenols and aldehydes are allowed to react with each other,
   a water-soluble organic phosphonic acid is used as a reaction catalyst, and
   a tertiary phosphine compound is used as a reaction promoter.

2. The method of manufacture of novolac-type phenol resin according to claim 1, wherein 100 to 5000 ppm of said tertiary phosphine compound is used relative to said phenols.

3. The method of manufacture of novolac-type phenol resin according to claim 1, wherein said phenols and aldehydes are reacted in the reaction system under conditions of a moisture content of 30 weight % or less, and a reaction temperature of 110 to 200° C.

4. The method of manufacture of novolac-type phenol resin according to claim 1, wherein said water-soluble organic phosphonic acid has a structure represented by the following general formula (1):

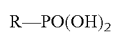  (1)

(R is a group which contains a carbon atom, and which contains —COOH and/or —PO(OH)$_2$).

5. The method of manufacture of novolac-type phenol resin according to claim 1, wherein said tertiary phosphine compound is triphenyl phosphine.

6. The method of manufacture of novolac-type phenol resin according to claim 1, wherein said phenols and aldehydes are reacted in a closed apparatus.

7. The method of manufacture of novolac-type phenol resin according to claim 1, wherein said phenols, aldehydes, water-soluble organic phosphonic acid, and tertiary phosphine compound are supplied together to cause a reaction.

8. The method of manufacture of novolac-type phenol resin according to claim 1, wherein said phenols and aldehydes are reacted in a continuous mixing apparatus.

9. The method of manufacture of novolac-type phenol resin according to claim 8, wherein a stationary mixer is used as said continuous mixing apparatus.

\* \* \* \* \*